United States Patent
McBrearty et al.

(10) Patent No.: US 7,596,668 B2
(45) Date of Patent: Sep. 29, 2009

(54) METHOD, SYSTEM AND PROGRAM PRODUCT FOR ASSOCIATING THREADS WITHIN NON-RELATED PROCESSES BASED ON MEMORY PAGING BEHAVIORS

(75) Inventors: Gerald F. McBrearty, Austin, TX (US); Shawn P. Mullen, Buda, TX (US); Jessica C. Murillo, Round Rock, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 11/676,658

(22) Filed: Feb. 20, 2007

(65) Prior Publication Data

US 2008/0201545 A1 Aug. 21, 2008

(51) Int. Cl.
*G06F 12/00* (2006.01)
(52) U.S. Cl. .................. 711/159; 711/156; 717/127; 717/130; 718/102
(58) Field of Classification Search ............... 711/159, 711/156; 717/127, 130; 518/102
See application file for complete search history.

(56) References Cited

U.S. PATENT DOCUMENTS

| | | |
|---|---|---|
| 5,590,326 A | 12/1996 | Manabe |
| 6,496,909 B1 | 12/2002 | Schimmel |
| 6,799,147 B1 * | 9/2004 | Balasubramanian et al. 702/186 |
| 6,874,099 B1 * | 3/2005 | Balasubramanian et al. ... 714/4 |
| 7,363,543 B2 * | 4/2008 | Peebles et al. ............... 714/26 |
| 2005/0050296 A1 | 3/2005 | Kottapalli et al. |
| 2005/0097294 A1 | 5/2005 | Hepkin |

FOREIGN PATENT DOCUMENTS

| | | |
|---|---|---|
| JP | 08-030512 | 2/1996 |
| WO | WO2006092587 | 9/2006 |
| WO | WO2006092589 | 9/2006 |

OTHER PUBLICATIONS

"Memory Management for Multi-Threaded Software DSM Systems"; Yang-Suk Kee, Jin-Soo Kim and Soonhoi Ha; Parallel Computing; Jan. 2004, vol. 30, n1; pp. 121-138.

(Continued)

*Primary Examiner*—Stephen C Elmore
(74) *Attorney, Agent, or Firm*—Dillon & Yudell LLP

(57) ABSTRACT

A method of tying related process threads within non-related applications together in terms of memory paging behavior. In a data processing system, a first process thread is related to one or more "partner" threads within separate high latency storage locations. The kernel analyzes the memory "page-in" patterns of multiple threads and identifies one or more partner threads of the first thread based on user input, observed memory page-in patterns, and/or pre-defined identification information within the thread data structures. The kernel marks the first thread and its corresponding related partner threads with a unique thread identifier. When the first thread is subsequently paged into a lower latency memory, the kernel also pages-in the related partner threads that are marked with the unique thread identifier in lockstep. Tying related threads from non-related applications together in terms of memory paging behavior thus eliminates memory management delays.

18 Claims, 4 Drawing Sheets

OTHER PUBLICATIONS

"On-Line Multi-Threaded Scheduling"; Feuerstein, E., Mydlarz, M. and Stougie, L.; (1999); http://citeseer.ist.psu.edu/feuerstein99line.html, pp. 1-12.

"New Results on Fair Mulit-Threaded Paging" Strejilevich de Loma, A.; 1998 Electronic Journal of SADIO 1, 1(May); 21-36; http://citeseer.istpsu.edu/strejilevichdeloma97new.html, pp. 1-9.

* cited by examiner

METHOD, SYSTEM AND PROGRAM PRODUCT FOR ASSOCIATING THREADS WITHIN NON-RELATED PROCESSES BASED ON MEMORY PAGING BEHAVIORS

BACKGROUND OF THE INVENTION

1. Technical Field

The present invention relates in general to data processing systems and in particular to kernel process management. Still more particularly, the present invention relates to an improved method, system and program product for associating threads from non-related processes.

2. Description of the Related Art

The memory system of a typical personal computer includes one or more nonvolatile mass storage devices, such as magnetic or optical disks, and a volatile random access memory (RAM), which can include both high speed cache memory and slower main memory. In order to provide enough addresses for memory-mapped input/output (I/O) as well as the data and instructions utilized by operating system and application software, the processor of a personal computer typically utilizes a virtual address space that includes a much larger number of addresses than physically exist in RAM. Therefore, to perform memory-mapped I/O or to access RAM, the processor maps the virtual addresses into physical addresses assigned to particular I/O devices or physical locations within RAM.

In the PowerPC™ RISC architecture, the virtual address space is partitioned into a number of memory pages, which each have an address descriptor called a Page Table Entry (PTE). The PTE corresponding to a particular memory page contains the virtual address of the memory page as well as the associated physical address of the page frame, thereby enabling the processor to translate any virtual address within the memory page into a physical address in memory. The PTEs, which are created in memory by the operating system, reside in Page Table Entry Groups (PTEGs), which can each contain, for example, up to eight PTEs. According to the PowerPC™ architecture, a particular PTE can reside in any location in either of a primary PTEG or a secondary PTEG, which are selected by performing primary and secondary hashing functions, respectively, on the virtual address of the memory page. In order to improve performance, the processor also includes a Translation Lookaside Buffer (TLB) that stores the most recently accessed PTEs for quick access.

In conventional computer operating systems (OSs), multiple processes' threads can share a single physical processor. Each process thread periodically is executed by the processor for a pre-defined amount of time (often called a time slice). However, an active process thread rarely utilizes all of the multiple execution units within a modern processor during a clock cycle. Simultaneous multithreading (SMT) enables multiple processes' threads to execute different instructions in the same clock cycle, thereby using execution units that would otherwise be left idle by a single process thread.

Application programs often require assistance from another application (also referred to as a "partner application") or kernel process, such as a device driver or daemon, to complete one or more operations. In some cases, the partner application or assisting kernel process is unknown at the time the application program is coded since application programs, data processing system hardware and operating systems are frequently independently developed or developed by different vendors. Application programs that rely upon assistance of partner applications or assisting kernel processes often exhibit sub-optimal performance when memory constraints or other operating conditions cause the application programs to be paged into memory, since the partner application/process will also be paged into memory in a "lagging" manner. Paging a partner application/process into memory in a lagging manner delays the execution of an assisted application that is awaiting the page in of the partner application in the execution path.

SUMMARY OF THE INVENTION

Disclosed are a method, system, and computer program product for associating related process threads within non-related applications in terms of memory paging behavior. In a data processing system, a first process thread is related to one or more "partner" threads within separate high latency storage locations. The kernel identifies one or more related threads of the first thread based on user input, thread "page-in" patterns, and/or pre-defined identification information within the thread data structures. The kernel utilizes the thread identification information to group the first thread together with one or more related partner threads for memory management page-in purposes. The first thread and matching related partner threads are thus paged into a lower latency memory within the same or a comparable execution cycle, thereby eliminating execution delays for the first thread, which would otherwise have to wait as the one or more partner threads were paged into the lower latency memory from the separate higher latency storage locations in a lagging manner. Tying related threads from non-related applications together in terms of memory paging behavior thus increases the execution efficiency of the processor by improving memory management.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
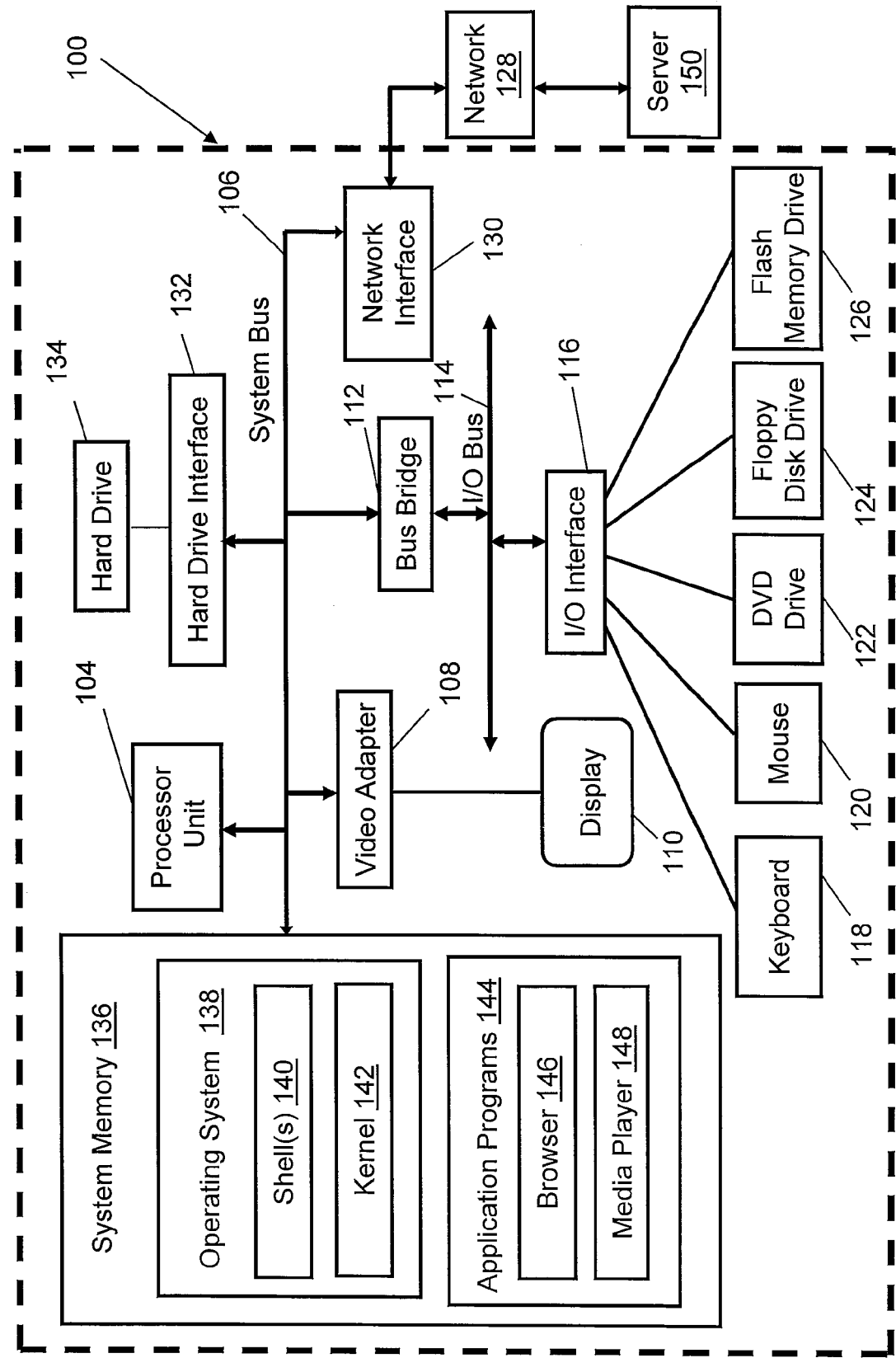
FIG. 1 depicts an exemplary data processing system in accordance with the present invention.

With reference now to the figures and in particular with reference to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. I/O interface 116 is coupled to I/O bus 114. I/O interface 116 affords communication with various I/O devices, including a keyboard 118, a mouse 120, a Digital Versatile Disk (DVD) drive 122, a floppy disk drive 124, and a flash drive memory 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, "slow" or higher latency data storage devices (e.g., hard drive 134 and DVD drive 122) populate one or more "fast" or lower latency storage devices (e.g., system memory 136), which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®) is a program that provides an interpreter and an interface between the user and the operating system. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and mouse and keyboard management.

Application programs 144 include browser 146 and media player 148. Browser 146 includes program modules and instructions enabling a World Wide Web (WWW) client (i.e., computer 100) to send and receive network messages to the Internet. Computer 100 may utilize HyperText Transfer Protocol (HTTP) and Simple Mail Transport Protocol (SMTP) messaging to enable communication with server 150. Media player 148 enables computer 100 to execute various audio and/or visual media programs from one or more storage locations, such as DVD drive 122, hard drive 134, and server 150.

The hardware elements depicted in computer 100 are not intended to be exhaustive, but rather represent and/or highlight certain components that may be utilized to practice the present invention. For instance, computer 100 may include alternate memory storage devices such as magnetic cassettes, Compact Disk-Read Only Memory (CD-ROM), etc. These and other variations are intended to be within the spirit and scope of the present invention.

Figure 2:
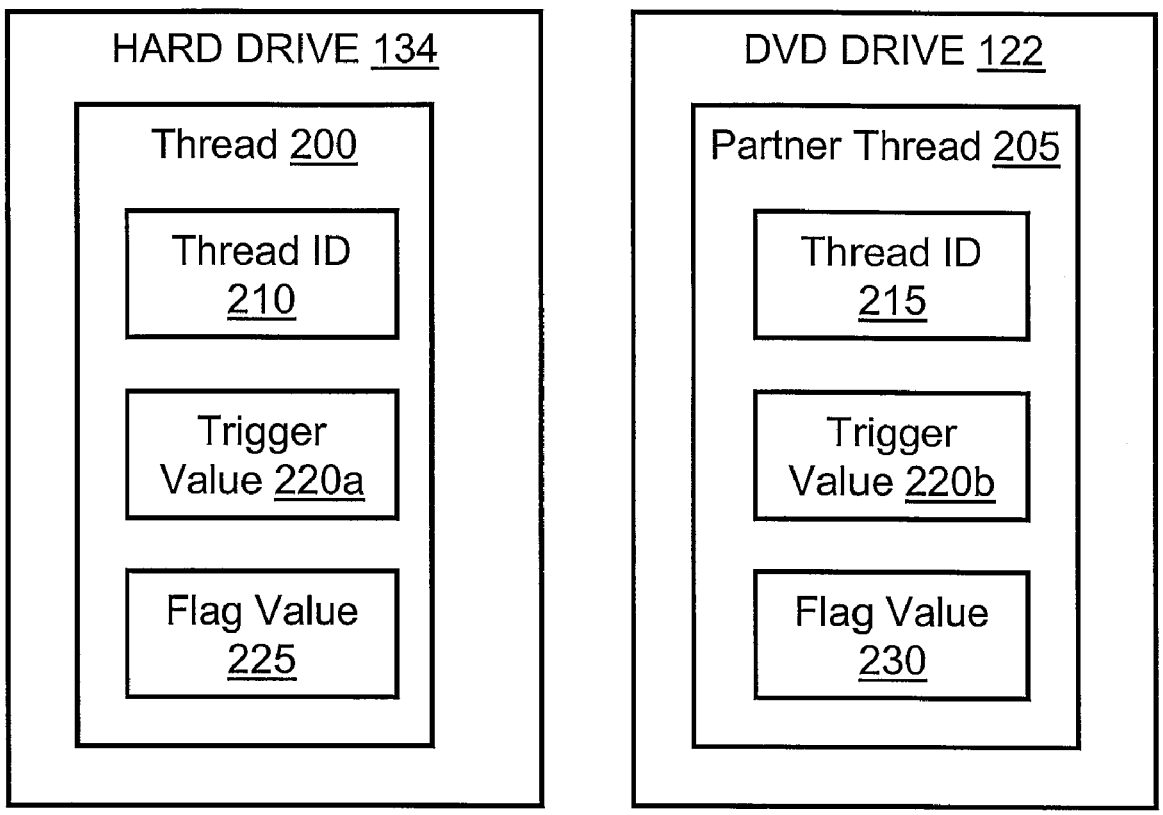
FIG. 2 illustrates a block diagram of a thread and a related "partner" thread within different processes, in accordance with the present invention.
Figure 3A:
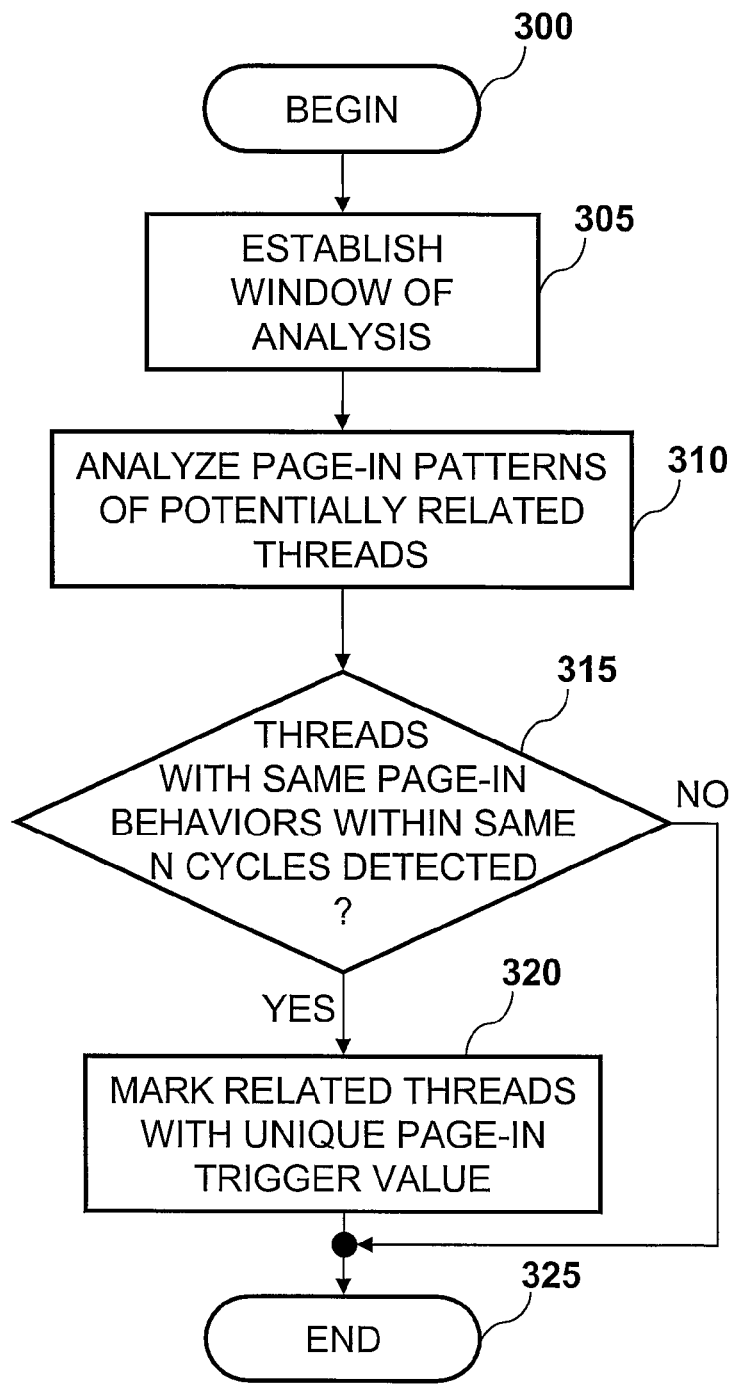
FIG. 3A is a high level logical flowchart of an exemplary method of utilizing kernel deduction to associate related threads from non-related applications for memory page-in purposes, in accordance with the present invention.
Figure 3B:
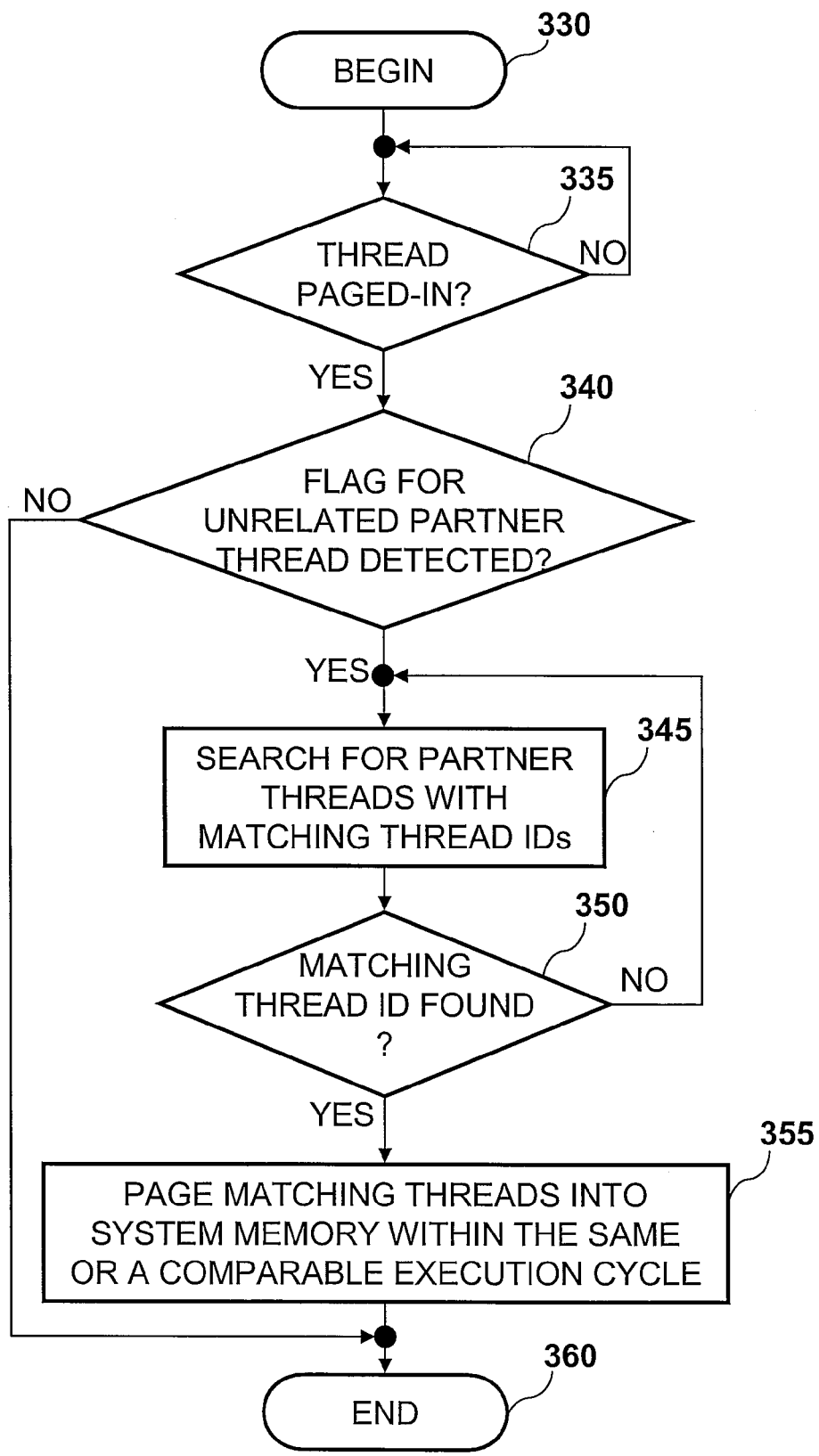
FIG. 3B is a high level logical flowchart of an exemplary method of utilizing a programmable user interface to associate related threads from non-related applications together for memory page-in purposes, in accordance with the present invention.

With reference now to FIG. 2, there is depicted a block diagram of thread 200 and related "partner" thread 205, in accordance with the present invention. As utilized herein, a related partner thread refers to a thread that provides information and/or performs processes required by thread 200. In one example, thread 200 forms a portion of media player 148 (from FIG. 1) that, when not running, resides in hard drive 134, and partner thread 205 resides on a DVD within DVD drive 122 (from FIG. 1). Related threads may originate from different non-related processes, device drivers, or kernel scripts. Thread 200 includes a thread identifier (ID) 210, which is unique to thread 200, a flag value 225, and a trigger value 220a that can be utilized to tie thread 200 to a separate related thread, as illustrated in FIGS. 3A and 3B and discussed below. As utilized herein, a thread ID refers to predefined identification information included within the data structure of a thread. Similarly, partner thread 205 includes thread ID 215, which is unique to partner thread 205, flag value 230, and trigger value 220b, which ties partner thread 205 to thread 200.

According to the illustrative embodiment, when thread 200 of media player 148 is executed by processor unit 104, thread 200 requires input or processing from partner thread 205, which is located in DVD drive 122 (i.e., high latency storage). Kernel 63 ties partner thread 205 to thread 200 using one of the methods illustrated in FIGS. 3A and 3B, which are discussed below, to ensure that partner thread 205 is paged into system memory 136 (i.e., low latency storage) beginning at the same or a closely subsequent execution cycle as thread 200. Consequently, when kernel 63 wakes up partner thread 205 in system memory 136 within the same or a comparable execution cycle as thread 200, kernel 63 is able to eliminate the execution delay that would otherwise occur if thread 200 had to wait for partner thread 205 to be paged in from DVD drive 122 in a lagging manner.

Turning now to FIG. 3A, there is illustrated a high level logical flowchart of an exemplary method of utilizing kernel deduction to associate related threads for memory page-in purposes, in accordance with the present invention. The process begins at block 300 in response to processor unit 104 executing thread 200 and then proceeds to block 305, which depicts kernel 63 establishing, accessing or determining a duration of a window of analysis. The window of analysis is a time period within which kernel 63 tracks and analyzes the page-in patterns of multiple live threads in active and/or sleeping states. In one embodiment, the duration of the window of analysis may be a predetermined constant or default value stored within main memory 50. In another embodiment, kernel 63 may present a graphical user interface (GUI) to prompt a user to define the duration of the window of analysis.

At block 310, kernel 63 analyzes the page-in patterns of threads that are active within the defined window of analysis in order to identify potentially related threads (i.e., partner threads). If thread 200 "wakes up" or is paged into page table 60 during one or more execution cycles of processor unit 104 within the window of analysis, kernel 63 determines whether thread 200 requires input from (i.e., issues a page-in request for) any partner threads 205 during the same N cycles, where N is greater than or equal to 1, as illustrated in block 315. If kernel 63 determines that no partner threads 205 exhibit the same page-in behavior as thread 200 within the window of analysis, the thread matching process terminates at block 325.

If kernel 63 determines at block 315 that one or more partner threads 205 exhibit the same page-in behavior as thread 200, kernel 63 marks thread 200 and its one or more partner threads 205 with a unique trigger value 220, as illustrated in block 320, and the process terminates at block 325. As utilized herein, a unique trigger value 220 refers to a value that marks a group of one or more threads in order to enable kernel 63 to identify the thread(s) sharing the same trigger value 220 as a group and to wake up and/or page-in the group to system memory 136 within the same or closely timed execution cycles of processor unit 104. Kernel 63 may utilize multiple unique trigger values 220 to identify and group different threads 200 and their corresponding partner threads 205 for memory page-in purposes.

Turning now to FIG. 3B, there is illustrated a high level logical flowchart of an exemplary method of memory management that pages into low latency data storage related threads from non-related processes, in accordance with the present invention. The process begins at block 330 and then proceeds to block 335, which depicts kernel 63 determining whether a thread 200 has been paged into system memory 136 for execution. If a thread 200 has not been paged into system memory 136, the process returns to block 335. Once kernel 63 determines that a thread 200 has been paged into system memory 136, kernel 63 determines whether thread 200 includes flag value 225 within the data structure of thread 200 that indicates to kernel 63 that thread 200 has a related partner thread 205, as depicted in block 340.

If kernel 63 determines that thread 200 does not include flag value 225 to indicate that thread 200 has a related partner thread 205 (i.e., thread 200 does not depend on any partner threads 205), the thread matching process terminates at block 360. If kernel 63 determines that thread 200 includes flag value 225, which is set to indicate that thread 200 has a related partner thread 205 (i.e., thread 200 depends on one or more partner threads 205), kernel 63 searches for partner threads 205 that include trigger values 220 that match the trigger value 220*a* of thread 200, as depicted in block 345. According to the illustrative embodiment, each thread within a set of one or more related threads (e.g., thread 200 and one or more partner threads 205) includes the same trigger value 220. Trigger values are thus unique to a particular set of related threads, such that kernel 63 can recognize different sets of related threads.

At block 350, kernel 63 determines whether one or more partner threads 205 that include trigger value 220 that matches trigger value 220*a* of thread 200 (i.e., matching partner threads 205) were found during the search performed at block 345, which is described above. If kernel 63 does not find one or more partner threads 205 with trigger value 220 that matches trigger value 220*a* of thread 200, the process returns to block 345 until one or more matching partner threads 205 are identified. Once kernel 63 identifies one or more matching partner threads 205, kernel 63 pages the related threads into system memory 136 within the same or a comparable execution cycle, as depicted in block 355 and the process terminates at block 360.

The present invention thus enables kernel 63 to identify related groups of threads within different applications based on user input and/or pre-defined identification information within thread data structures. Kernel 63 utilizes the thread identification information to group thread 200 and one or more partner threads 200 together for page-in purposes, thereby eliminating execution delays for thread 200 by enabling one or more partner threads 205 to be paged into system memory 136 within the same or a comparable execution cycle as thread 200. The present invention thus increases the execution efficiency of processor unit 104 by associating related threads residing in possibly different high latency storage locations for contemporaneous or nearly contemporaneous page-in into low latency data storage (e.g., system memory 136) during execution.

It is understood that the use herein of specific names are for example only and not meant to imply any limitations on the invention. The invention may thus be implemented with different nomenclature/terminology and associated functionality utilized to describe the above devices/utility, etc., without limitation.

While an illustrative embodiment of the present invention has been described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. In a data processing system, a method comprising:
   analyzing memory page-in patterns of a plurality of threads including first and second threads;
   identifying the second thread as related to the first thread based on said memory page-in patterns of said plurality of threads;
   storing an indication that the second thread is related to the first thread; and
   when said first thread is paged into lower latency data storage from higher latency data storage, checking for the stored indication of a related thread and paging said second thread into said lower latency data storage based upon said stored indication.

2. The method of claim 1, wherein analyzing said memory page-in patterns further comprises defining a window of analysis that includes a pre-determined number of execution cycles.

3. The method of claim 1, wherein storing the indication comprises storing a trigger value.

4. The method of claim 3, wherein said storing said trigger value further comprises storing the trigger value within a data structure in said first thread.

5. The method of claim 4, wherein:
   said plurality of threads further includes a third thread also related to said first thread; and
   said step of storing the trigger value further comprising storing the trigger value in said second and third threads.

6. The method of claim 1, wherein the paging in of said second thread into lower latency data storage is initiated in a same execution cycle as said first thread is paged into said memory.

7. A data processing system comprising:
   a processor;
   a memory;
   a kernel within said memory, wherein said memory stores a plurality of threads utilized during execution of processes on said processor by said kernel;
   means for analyzing memory page-in patterns of said plurality of threads including first and second threads;
   means for identifying the second thread as related to the first thread based on said memory page-in patterns of said plurality of threads;
   means for storing an indication that the second thread is related to the first thread; and
   when said first thread is paged into lower latency data storage from higher latency data storage, means for checking for the stored indication of a related thread and paging said second thread into said lower latency data storage based upon said stored indication.

8. The data processing system of claim 7, wherein said means for analyzing said memory page-in patterns further comprises means for defining a window of analysis that includes a pre-determined number of execution cycles.

9. The data processing system of claim 7, wherein said means for storing the indication comprises means for storing a trigger value.

10. The data processing system of claim 9, wherein said means for storing said trigger value further comprises means for storing the trigger value within a data structure in said first thread.

11. The data processing system of claim 10, wherein:
said plurality of threads further includes a third thread also related to said first thread; and
said means for storing the trigger value further comprising storing the trigger value in said second and third threads.

12. The data processing system of claim 7, wherein the paging in of said second thread into lower latency data storage is initiated in a same execution cycle as said first thread is paged into said memory.

13. A computer program product comprising:
a computer readable storage medium; and
program code on said computer readable storage medium that that when executed provides the functions of:
analyzing memory page-in patterns of a plurality of threads including first and second threads;
identifying the second thread as related to the first thread based on said memory page-in patterns of said plurality of threads;
storing an indication that the second thread is related to the first thread; and
when said first thread is paged into lower latency data storage from higher latency data storage, checking for the stored indication of a related thread and paging said second thread into said lower latency data storage based upon said stored indication.

14. The computer program product of claim 13, wherein analyzing said memory page-in patterns further comprises defining a window of analysis that includes a pre-determined number of execution cycles.

15. The computer program product of claim 13, wherein storing the indication comprises storing a trigger value.

16. The method of claim 15, wherein said storing a trigger value further comprises storing the trigger value within a data structure in said first thread.

17. The computer program product of claim 16, wherein:
said plurality of threads further includes a third thread also related to said first thread; and
said storing the trigger value further comprising storing the trigger value in said second and third threads.

18. The computer program product of claim 13, wherein the paging in of said second thread into lower latency data storage is initiated in a same execution cycle as said first thread is paged into said memory.

* * * * *